July 13, 1965  J. F. McLAY  3,194,533
NEEDLE VALVE
Filed Aug. 29, 1961

INVENTOR.
JOSEPH F. McLAY
BY
ATTORNEYS 3,194,533
NEEDLE VALVE
Joseph F. McLay, Warminster, Pa., assignor to Fischer & Porter Company, Warminster, Pa., a corporation of Pennsylvania
Filed Aug. 29, 1961, Ser. No. 134,616
1 Claim. (Cl. 251—122)

This invention relates to needle valves particularly adapted for glass laboratory apparatus.

The general object of the present invention is to provide a needle valve for the very fine control of flow such as is often required in laboratory apparatus. In particular, the housing for the valve and the seat portion thereof are of glass, and the needle valve is formed of plastic components having high chemical resistance. A relatively pliant plastic such as tetrafluoroethylene (commercially sold as Teflon) is used for the valve proper and is carried by a stem formed of a relatively rigid plastic such as trifluorochloroethylene (commercially sold as Kel-F) both of these plastics have high chemical resistance and stand up under wide ranges of temperature.

The foregoing and other objects of the invention, particularly relating to details of construction, will be apparent from the following description, read in conjunction with the accompanying drawing, in which.

Figure 1:
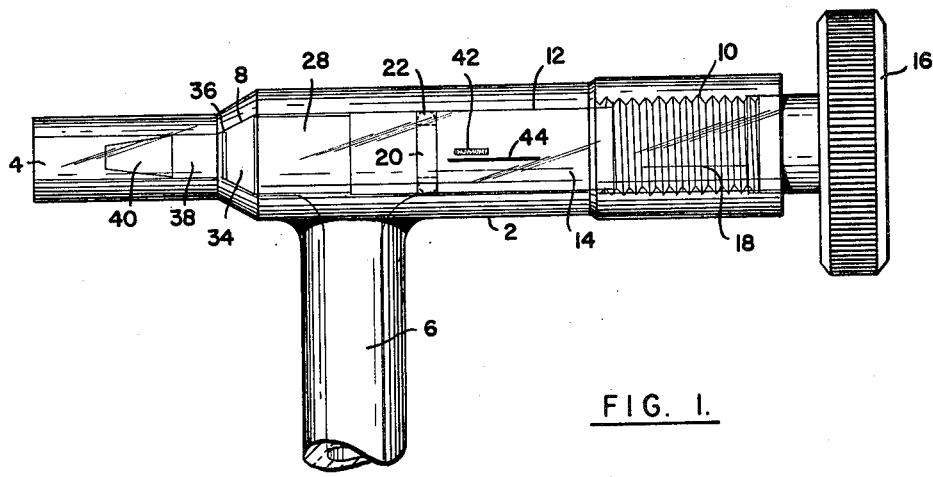
FIGURE 1 is an elevation, much enlarged, showing a valve assembly provided in accordance with the invention.
Figure 2:
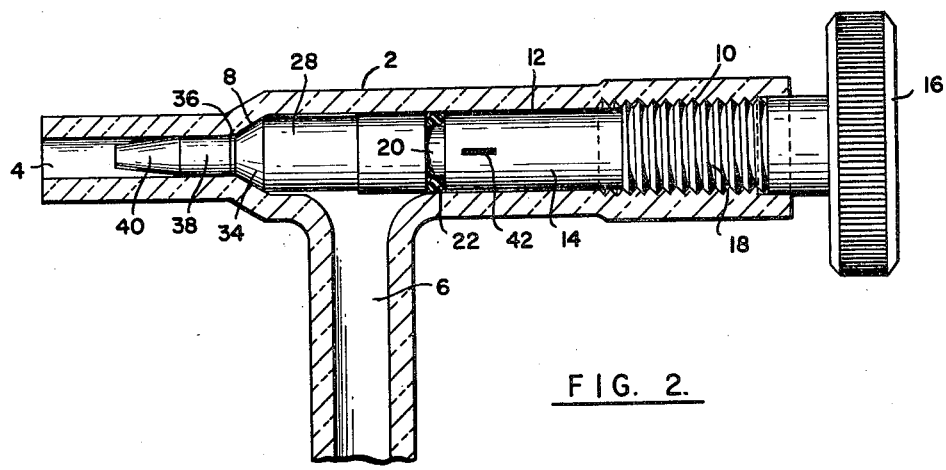
FIGURE 2 is a vertical section of the assembly shown in FIGURE 1 taken through the axis of the assembly.
Figure 3:
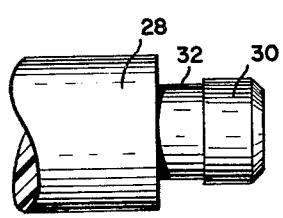
FIGURE 3 is a further enlarged fragmentary elevation showing a detail of the right-hand end of the valve proper.
Figure 4:
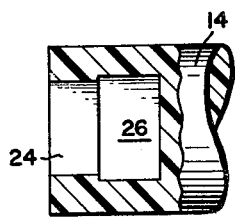
FIGURE 4 is a fragmentary enlarged section illustrating the form of a socket in the stem arranged to carry the valve element.

In its application to laboratory glassware the valve may be quite small, the threaded portions shown in FIGURES 1 and 2, for example, having diameters which may be as small as ¼ inch or even less. In other uses, of course, the elements may be larger.

A housing 2 of glass is provided with passages 4 and 6 through which flow is to be controlled. The illustrated tubes provided with these passages may be variously arranged and fused or otherwise connected to other apparatus such as burettes or various other vessels or to glass or other tubes involved in apparatus requiring flow control. The bore 4 is desirably cylindrical and connects to a conical seat 8 which may have an included angle such as that of 60° illustrated. As will appear, this seat is primarily used for cut-off purposes. The glass housing is threaded internally at 10 to provide for adjustment of the valve stem. A cylindrical bore 12 extends between the threads 10 and the seat 8.

The valve stem 14 is desirably formed of trifluorochloroethylene (Kel-F) or an equivalent plastic having high resistance to chemicals and temperature changes. This stem is strong and rigid and may readily have formed thereon the threads 18 which are received in the threaded portion 10 of the glass housing. The outer end of the stem is provided with a knurled knob 16 for its manipulation. The stem is grooved as indicated at 20 for the reception of a leak-preventing O-ring 22 which bears against the walls of the cylindrical bore 12.

At its left-hand end, as shown, the stem 14 is provided with a bore 24 communicating with an enlarged socket 26.

The valve proper 28 is desirably formed of tetrafluoroethylene (Teflon) or its equivalent. This plastic, which exhibiting a substantial degree of stiffness is flexible and therefore conformable to surfaces againt which it may be pressed. Because of this characteristic and also because its surface has a very low coefficient of friction it is admirably adapted to use in chemical apparatus without the use of any lubricant or sealing liquid under conditions where binding or sticking would be likely to occur when the apparatus remains subjected to chemicals through extended periods of non-use. Because of the softness, furthermore, it readily conforms to minor misalignments where close clearances or fits are involved.

Furthermore, use is made of the flexibility or pliability of this material in effecting simple attachment to the valve stem. For this purpose the valve element 28 is provided with a plug or head 30 and a slightly reduced neck portion 32 so that the plug 30 may be forced through the bore 24 and snapped into the socket 26 of the stem 14. An adequate attachment is thus provided whereby the stem may withdraw the valve member outwardly from its seat. Dislodgment of the plug or head from the socket requires the exercise of substantial force greatly exceeding that normally required even to dislodge the valve element in case of sticking.

The valve element 28 is provided with a conical surface 34 having the same included angle as the seat 8. Precise conformity, however, is not required, since when the valve element is forced against the seat its surface 34 will conform thereto to provide a fluid tight seal. To the left of the conical surface 34 there is desirably a short cylindrical surface 36 having substantially the diameter of the bore 4, there being here required only a small clearance of the order of a few ten thousandths of an inch. To the left of this there is provided the tapered portion 38 having a very slight taper with an included angle which may be only one or two degrees. It is this taper, in particular, which is involved in the effecting of close control. To the left of the portion 38 the valve element is provided with a tapered nose portion 40 which may typically have an included angle of the order of 17°. This portion of the valve element may be used for control of relatively larger flows. It also serves for guidance of the left-hand portion of the valve element 28 into the bore 4 in initial assembly.

For the purpose of resetting the valve to a desired flow rate the stem 14 may be conveniently provided with a set of grooves 42, for example at 90° intervals, filled with different colored lacquers so as to be readable against an index marking 44 engraved into or otherwise applied to the housing.

Assuming the valve closed as illustrated in FIGURE 2, with the conical surface 34 engaging the seat 8 flow is completely cut off, the conical surface of the valve element conforming tightly thereto by reason of its softness. As the valve element is backed off by manipulation of knob 16 the sealing contact between 34 and 8 is broken though initially flow will be substantially prevented by the close fit of the cylindrical portions 36 with the bore 4. As the valve is still further backed off, the clearance for flow is increased very gradually by reason of the taper of the portion 38, and through an extent of movement corresponding to the length of the portion 38 very fine control of the flow may be secured. When the tapered portion 40 reaches the junction between the seat 8 and bore 4 the rate of flow may be very considerably increased but still controlled by reason of the taper 40.

While the entire movable valve assembly might be made of the soft plastic (Teflon) this is not particularly desirable for two reasons: first, the material is somewhat too soft for the formation of fine threads which are not likely to yield and slip lengthwise, and secondly, this material has such a low coefficient of friction with glass that a setting would be too easily disturbed. A plastic such as Kel-F, having not only mechanical strength and stiffness but also exhibiting a substantial coefficient of friction with respect to glass is more desirable.

It will be evident that various changes in details of construction may be made without departing from the invention as defined in the following claim.

What is claimed is:

A needle valve comprising a rigid glass housing having a larger bore which is at least partially threaded, a smaller bore, a fluid passage in communication with said larger bore, and a glass seat between said bores, and an adjustable valve having a threaded stem portion formed of a rigid material having substantially the mechanical properties of polytrifluorochloroethylene receivable in the first mentioned threads so as to be movable axially upon its rotation, and a valve portion having a surface engageable with said seat and having a gradually tapered flexible portion arranged to enter said smaller bore, said valve portion being formed of a material having substantially the mechanical properties of polytetrafluoroethylene for controlling fluid flow between said passage and said smaller bore.

References Cited by the Examiner

UNITED STATES PATENTS

| | | | |
|---|---|---|---|
| 2,655,041 | 10/53 | Jacobsson | 251—122 XR |
| 2,725,212 | 11/55 | Jensen | 251—122 |
| 2,833,512 | 5/58 | Sanborn | 251—368 X |
| 2,876,985 | 3/59 | Birchall | 251—368 X |
| 2,926,885 | 3/60 | Szulc | 251—368 X |

FOREIGN PATENTS

| | | |
|---|---|---|
| 557,268 | 11/57 | Belgium. |
| 557,329 | 5/57 | Belgium. |
| 558,431 | 5/23 | France. |
| 2,173 | 2/91 | Great Britain. |

M. CARY NELSON, *Primary Examiner.*

ISADOR WEIL, *Examiner.*